US006995387B2

(12) United States Patent
Vuylsteke et al.

(10) Patent No.: US 6,995,387 B2
(45) Date of Patent: Feb. 7, 2006

(54) SUPPRESSION OF PERIODIC VARIATIONS IN A DIGITAL SIGNAL

(75) Inventors: Pieter Vuylsteke, Mortsel (BE); Gert Behiels, Mechelen (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 11/077,726

(22) Filed: Mar. 11, 2005

(65) Prior Publication Data

US 2005/0258343 A1 Nov. 24, 2005

Related U.S. Application Data

(60) Provisional application No. 60/576,261, filed on Jun. 2, 2004.

(30) Foreign Application Priority Data

May 18, 2004 (EP) ................................ 04102185

(51) Int. Cl.
*G03B 42/02* (2006.01)

(52) U.S. Cl. ...................... 250/584; 250/586; 250/216

(58) Field of Classification Search ................ 250/216, 250/226, 214 R, 581, 584, 585, 586
See application file for complete search history.

(56) References Cited

U.S. PATENT DOCUMENTS 6,642,535 B2 * 11/2003 Gebele et al. ............. 250/584
2001/0006222 A1 7/2001 Gebele
2002/0071600 A1 6/2002 Yamada

OTHER PUBLICATIONS

Hilts, Michelle, "Image Filtering for Improved Dose Resolution in CT Polymer Gel Dosimetry," *Med. Phys.* 31(1) p. 39-49, Jan. 2004.
Kalra, Mannudeep K. et al., "Can Noise Reduction Filters Improve Low-Radiation-Dose Chest CT Images?" *Radiology,* vol. 228, No. 1, p. 257-264, Jul. 2003.
Kirsteins, Ivars P., "Adaptive Separation of Unknown Narrowband and Broadband Time Series," *Acoustics, Speech and Signal Processing. Proceedings on Seattle, WA*; p. 2525-2528, May 12, 1998.
Srivastava et al., "Design of 2D-Multiple Notch Filter and Its Application in Reducing Blocking Artifact from DCT Coded Image," *Proceedings of the 22nd Annual EMBS International Conference,* Jul. 23-28, 2000, p. 2829-2833.
European Search Report for EP 04102185 (Nov. 1, 2004).

* cited by examiner

*Primary Examiner*—Kevin Pyo
(74) *Attorney, Agent, or Firm*—Leydig, Voit & Mayer, Ltd.

(57) ABSTRACT

A suppression signal representing the periodic variation of a digital signal is separated into separation signals containing values of equal phase. The separations signals are subjected to high frequency attenuating filtering before being recomposed into a corrected suppression signal which is used for correcting the digital signal.

4 Claims, 10 Drawing Sheets

SUPPRESSION OF PERIODIC VARIATIONS IN A DIGITAL SIGNAL

CROSS-REFERENCE TO RELATED PATENT APPLICATIONS

This patent application claims the benefit of U.S. Provisional Patent Application No. 60/576,261, filed Jun. 2, 2004, which is incorporated by reference. In addition, this application claims the benefit of European Application No. 04102185.8 filed May 18, 2004, which is also incorporated by reference.

FIELD OF THE INVENTION

The present invention relates to a method of suppressing periodic variations in a digital signal.

Such a method is for example applicable to a digital signal representation of an image when said digital signal representation comprises periodic variations which create artifacts in the hard copy or soft copy image.

BACKGROUND OF THE INVENTION

Robust estimation of periodic artifacts is extremely difficult. A lot of research has been done to construct filters which only remove the periodic artifacts.

Most of these filters are not accurate at regions with high intensity gradients (edges). In these areas, most filters generate high responses.

The present invention specifically relates to an application in which an image signal is obtained by reading a radiation image that has been temporarily stored in a photo-stimulable phosphor screen. A digital signal representation of the stored radiation image is obtained by scanning the plate with stimulating radiation and converting the image wise modulated light which is emitted by the plate upon stimulation into a digital signal representation. The image-wise light emitted upon stimulation is focussed by means of an array of microlenses onto an array of transducers converting light into an electric signal.

Because an imaging plate such as a photo-stimulable phosphor screen has a varying thickness, several positions of the imaging plate are out of focus with respect to the microlens array.

After calibration of the received signal, the areas where the imaging plate was out of focus contain some periodic variation with the same period of the microlens array.

The period of a microlens array is defined as the width of one microlens in the microlens array.

When analyzing the Fourier spectrum of the received signal, peaks are observed in the Fourier spectrum at the frequency F of the microlens array and the harmonics, $F_n=nF$, n=1,2,3, . . . for a microlens with a width of T=1/F pixels. Many filters can be constructed to suppress periodic variation of this nature. However, they all have to be tuned carefully to ensure the removal of only the periodic variation.

In a similar manner, a filter can be constructed which extracts the periodic variation from the signal. This periodic estimation will contain extra erroneous information.

SUMMARY OF THE INVENTION

To overcome the above-mentioned disadvantages the present invention provides a method of suppressing periodic variations in a digital signal as set out in claim 1.

Specific features for preferred embodiments of the invention are set out in the dependent claims.

Applying the method of the present invention makes a designed filter more robust against the above-mentioned drawback and makes the result of applying the filter more periodic.

Further advantages and specific embodiments of the present invention will become apparent from the following description and drawings.

DETAILED DESCRIPTION OF THE INVENTION

The present invention will be described with reference to digital medical imaging, more specifically with reference to a computed radiography system as described below.

In computed radiography a digital signal representation of a radiographic image is read out of a photo-stimulable phosphor screen that has been exposed to a radiation image.

The digital signal representation is obtained by scanning the exposed photo-stimulable phosphor screen with stimulating radiation and by converting image-wise modulated light which is emitted by the screen upon stimulation into an electric signal representation. The electric signal representation is then digitized.

In such a system for reading a radiation image out of a photo-stimulable phosphor screen an array of microlenses may be used for collecting the image-wise modulated light which is emitted upon stimulation of the screen.

An example of such a read out system integrated in a cassette conveying the photo-stimulable phosphor screen has been described for example in U.S. 2003/0111620 and in U.S. Pat. No. 6,642,535.

Microlenses can for example be obtained from LIMO-Lissotschenko Mikrooptik GmbH, Hauert 7, 44227 Dortmunt, Germany.

Although the invention will be described with reference to a read out system using an array of microlenses, the principal of the invention also works for signals containing periodic variation originated by other features.

Figure 1:
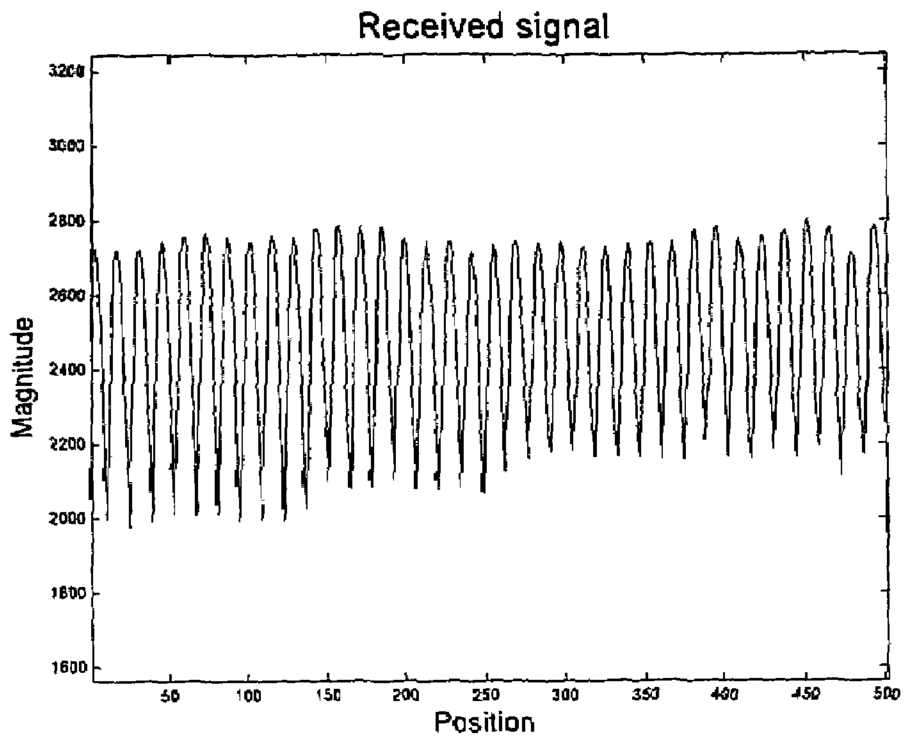
FIG. 1 shows the signal read out from a uniformly exposed imaging plate before calibration.
Figure 2:
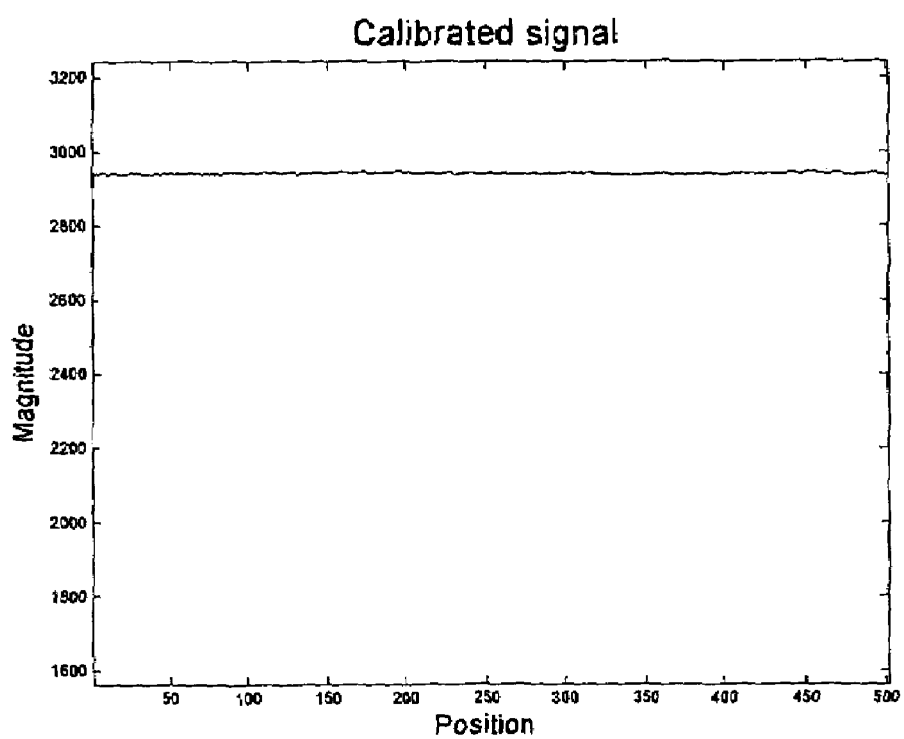
FIG. 2 shows the signal read from a uniformly exposed imaging plate after having been subjected to signal calibration.

Light collected with a microlens array shows a periodic variation with the same period as the microlens elements in the microlens array (FIG. 1). The period of a microlens array is defined as the width of an individual microlens element in a microlens array. After calibration with measured gain values, the received signal is transformed to a more homogeneous and constant signal (FIG. 2).

Figure 3:
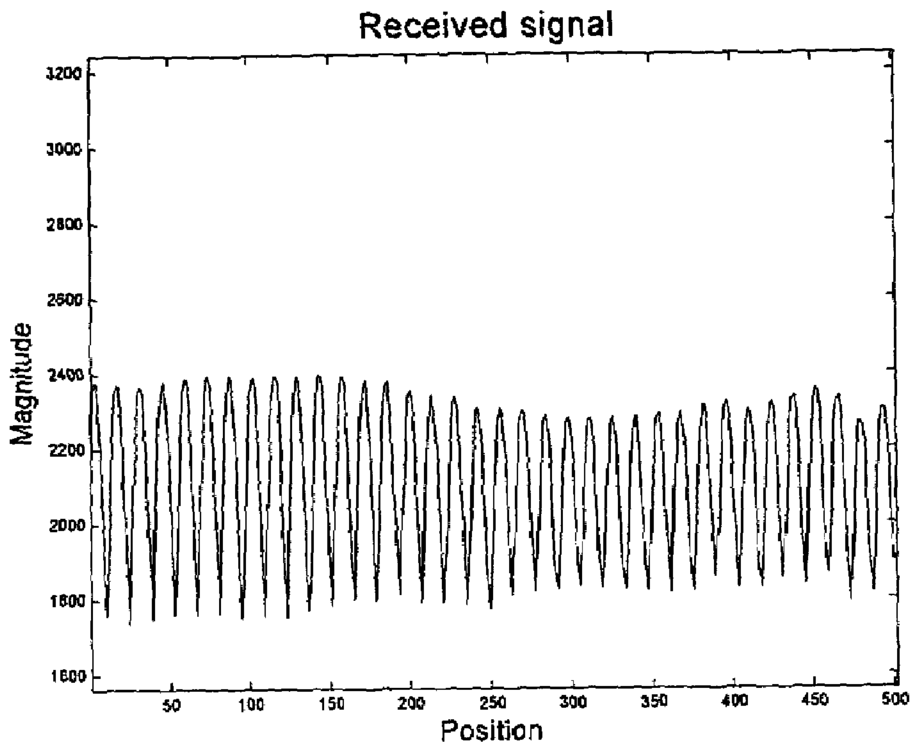
FIG. 3 shows the signal read from a uniformly exposed imaging plate placed out of focus.
Figure 4:
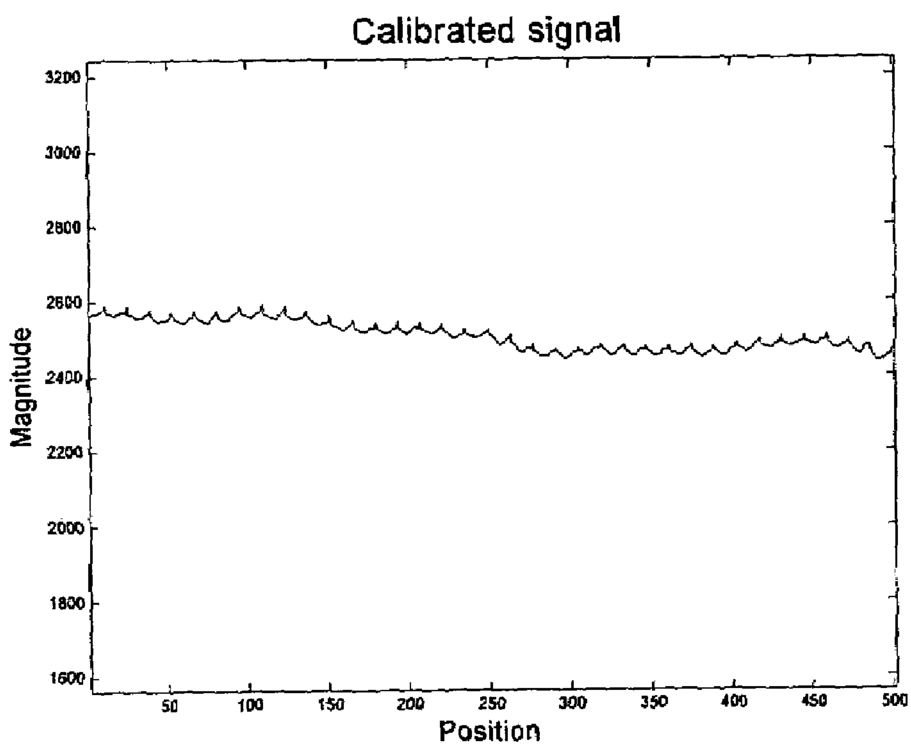
FIG. 4 shows the calibrated signal of a uniformly exposed imaging plate placed out of focus.

If an emitting light source is placed out of focus (which occurs when due to varying thickness of the photo-stimulable phosphor screen several positions of the screen are out of focus with regard to the microlens array) (FIG. 3) the calibrated signal is not homogeneous and contains period variation (FIG. 4).

This periodic variation is of a multiplicative nature. If C is the calibrated signal, we define $$S=\log C$$

to convert the multiplicative problem to an additive problem.

If $S_c$ is the corrected signal of S after applying the necessary correction steps described in the following sections, the corrected signal is converted using $$R=\exp S_c$$

to obtain the resulting signal R.

Figure 5:
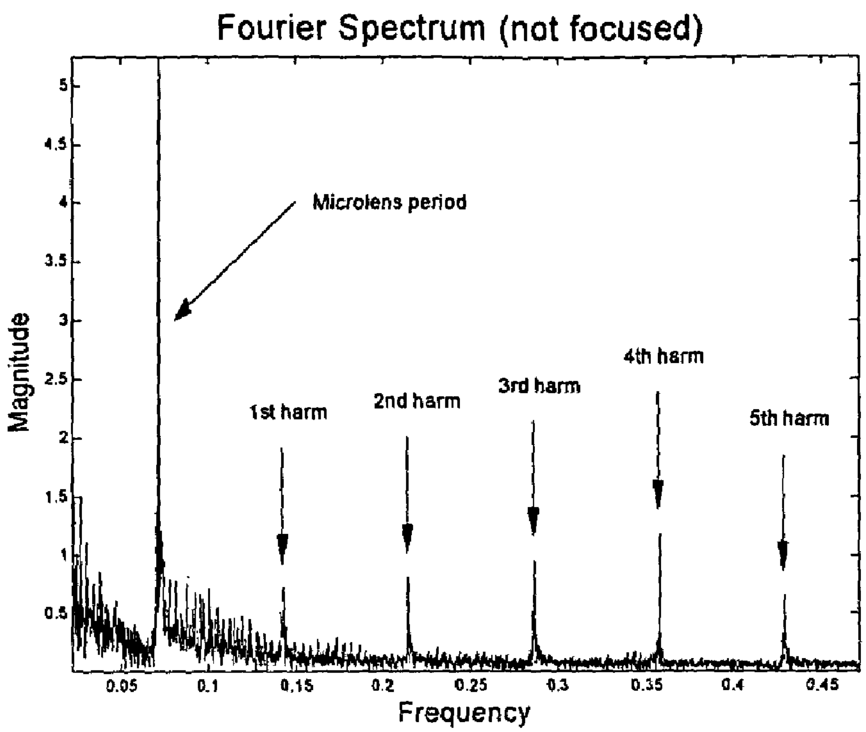
FIG. 5 shows part of the magnitude of the Fourier transformed calibrated signal of a uniformly exposed imaging plate placed out of focus.
Figure 6:
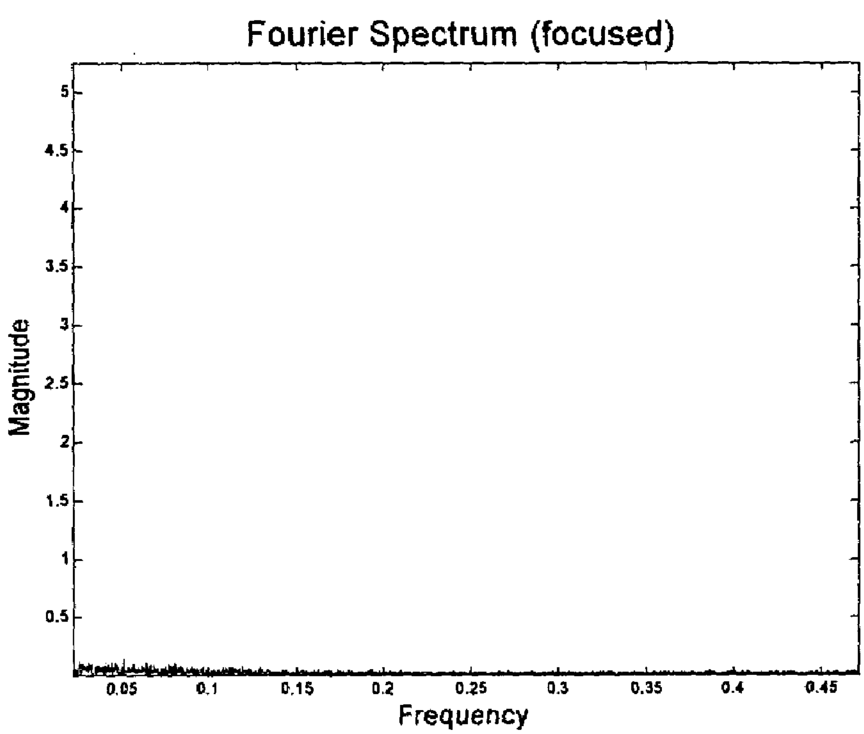
FIG. 6 shows part of the magnitude of the Fourier transformed is calibrated signal of a uniformly exposed imaging plate placed in focus, FIG. 7 displays the position of the correction algorithm in the image flow.

Fourier analysis of the calibrated signals S indicates peaks at the frequency F of the microlens and the harmonics (FIG. 5). These spectral peaks are not present in a signal collected from a focused imaging plate (FIG. 6).

Figure 7:
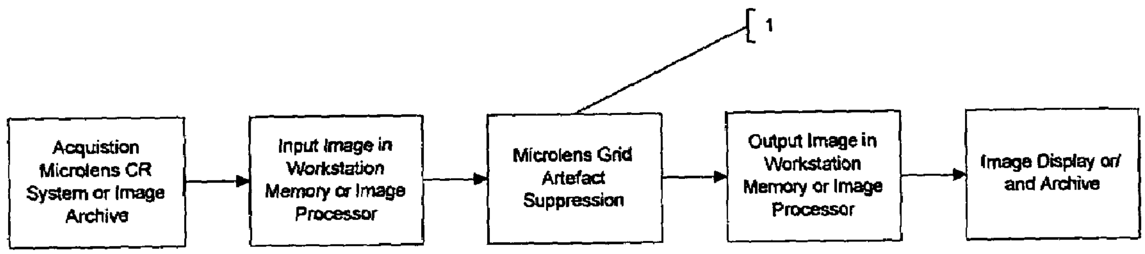

FIG. 7 shows the general flow that will be followed to suppress the described periodic variation.

A digital signal representation of an image is obtained by a computed radiography system as described higher or is retrieved from an archive system in case the image representation was generated earlier. Next, the image representation is applied to a work station or an image processing unit where the artefact suppression method according to the present invention is applied. Next, the corrected image representation is displayed or archived.

From the Fourier analysis of FIG. 5, it is clear that most of the information of the periodic variation in the Fourier domain is centered on its frequency and its harmonics. To extract this information, parameters are computed which are used to multiply with the previously computed Fourier spectrum. If $S_f$ is the Fourier transform of the calibrated signal S, $S_f$ is multiplied with W, where W are scale parameters.

$$S_f=\Im(S)$$

$$P_f=WS_f \quad (1)$$

$\Im$ denotes the Fourier transform. For this particular application, W is defined as $$W_s=\sum_{i=-n_h}^{n_h}\sum_{j=-\infty}^{\infty}e^{-\frac{(j-iF)^2}{2\sigma^2}} \quad (2)$$

$$W=\frac{W_s}{\max W_s}$$

$$\text{with } F=\frac{1}{14},\ n_h=5 \text{ and } \sigma=\frac{F}{3}.$$

However, the choice of W is not critical and any suitable set of scale parameters may be used.

Figure 8:
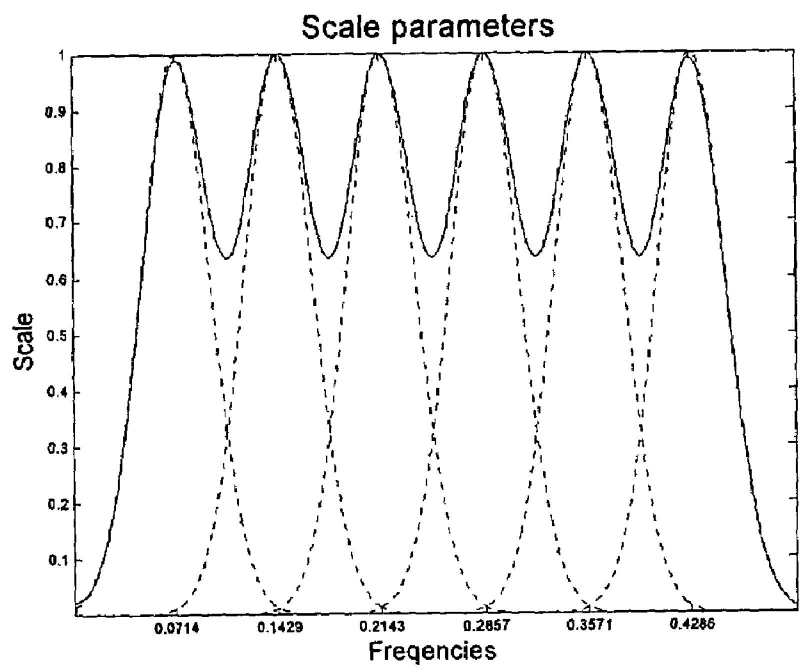
FIG. 8 shows the scale parameters that are applied to the Fourier transformed calibrated input signal.

FIG. 8 shows the scale parameters for i=1 . . . 5. Equations (1) and (2) are easily extended to two-dimensions for processing of 2D-images.

If it is assumed that $P_f$ is the Fourier transform of the correct period variation, the suppressed signal $S_c$ is obtained from $$S_c=\Im^{-1}(\Im(S)-W\Im(S))$$

$$S_c=S\times\Im^{-1}(1-W)$$

$$S_cS-S\times\Im^{-1}(W) \quad (3)$$

The assumption that $\Im^{-}(P_f)$ or $S\times\Im^{-1}(W)$ is the correct periodic variations is not entirely correct (see below).

Figure 9:
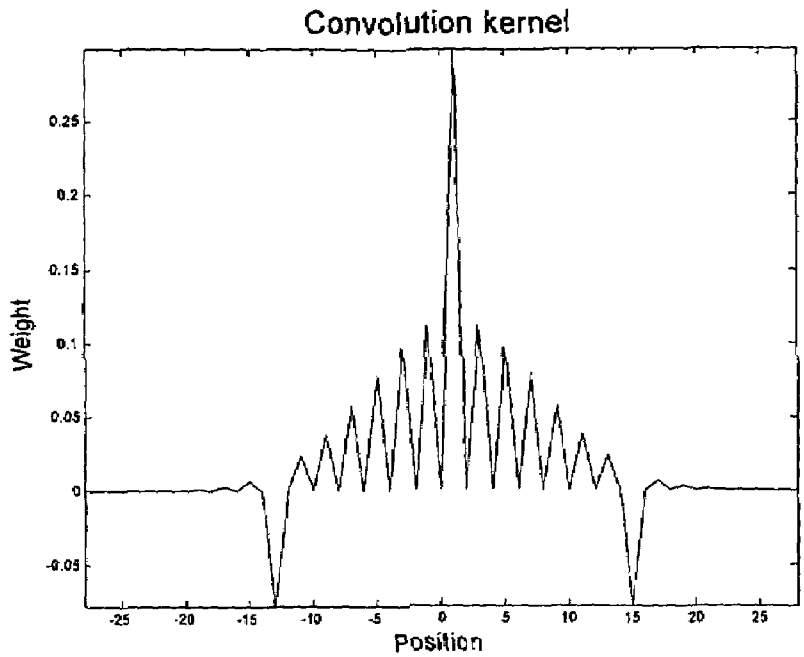
FIG. 9 shows the corresponding convolution kernel in the spatial domain of the scale parameters defined in Equation (2)

The convolution kernel $$K=\Im^{-1}(W)$$

is displayed in FIG. 9.

Figure 10:
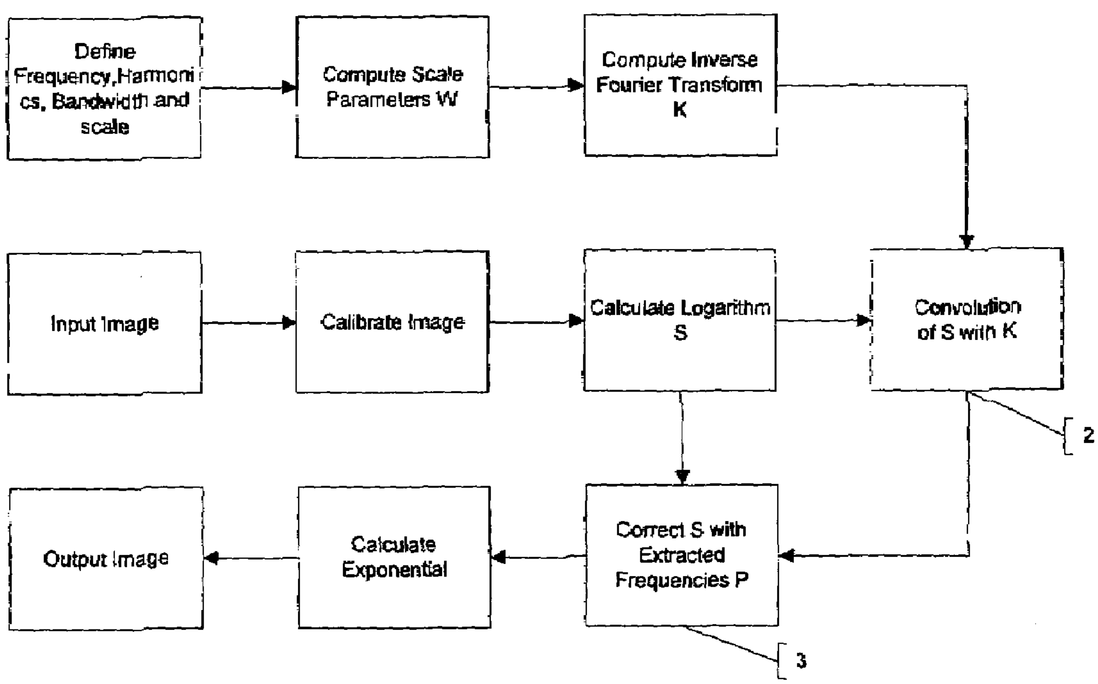
FIG. 10 shows a flow chart of the suppression method.

When applying the last form of Equation (3), the microlens grid artifact suppression block in FIG. 7 transforms to the flowchart in FIG. 10.

Figure 11:
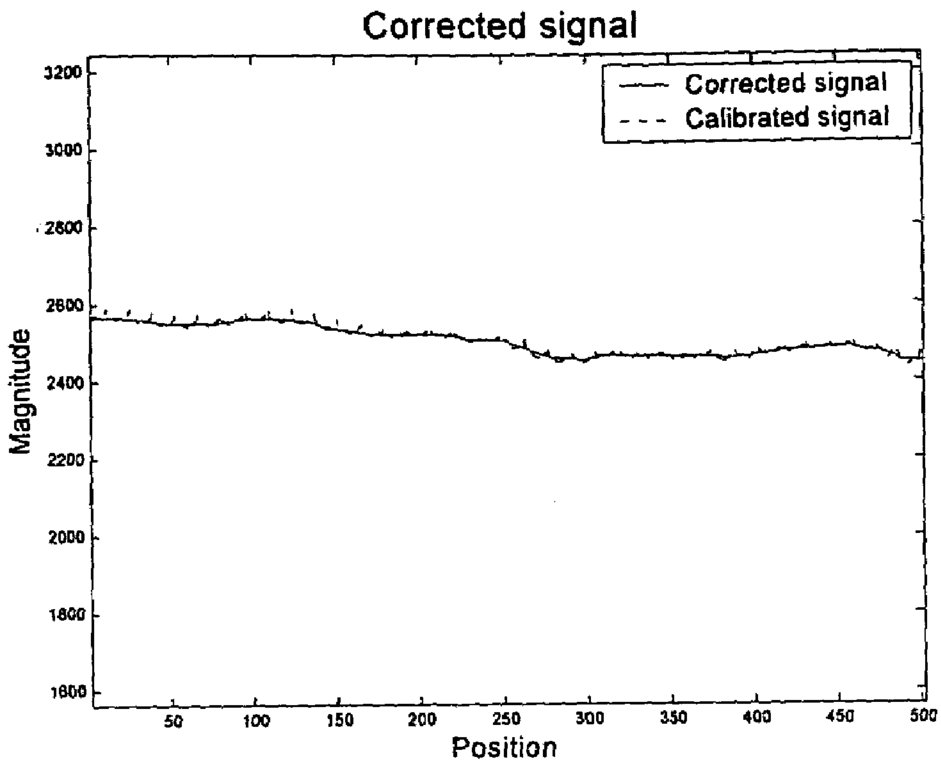
FIG. 11 shows the corrected signal of a uniformly exposed imaging plate placed out of focus using the method depicted in FIG. 10.

The correction algorithm applied to the signal of FIG. 4 is displayed in FIG. 11.

Figure 12:
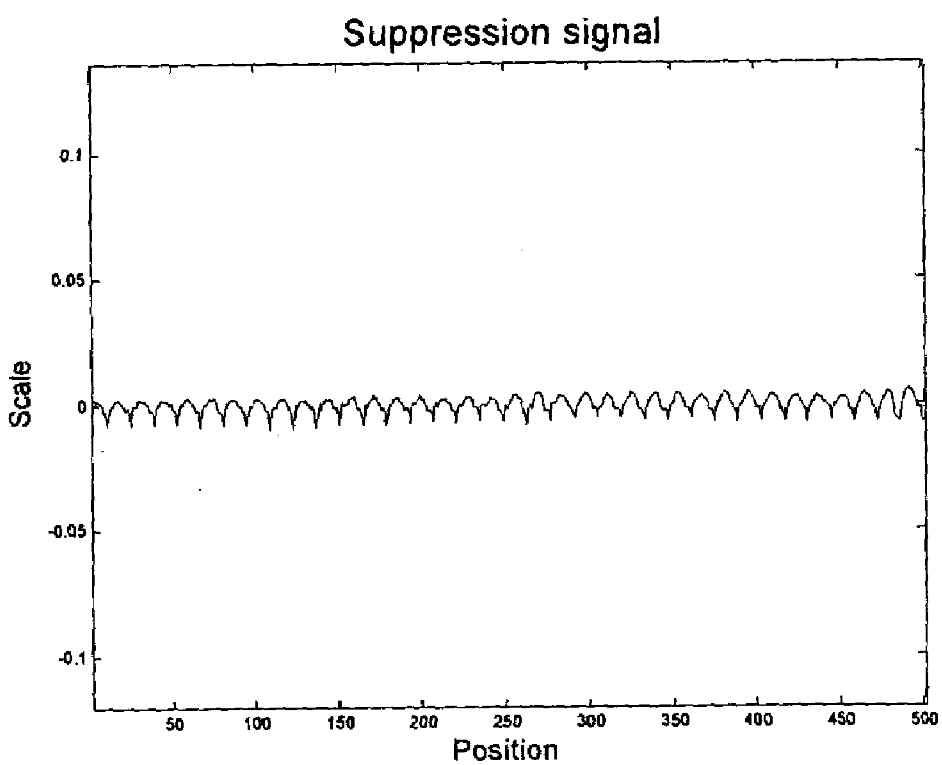
FIG. 12 shows the suppression signal used to suppress the periodic variation of the signal displayed in FIG. 4.

FIG. 12 shows the suppression signal. This is signal is relatively constant and periodic of nature.

Figure 13:
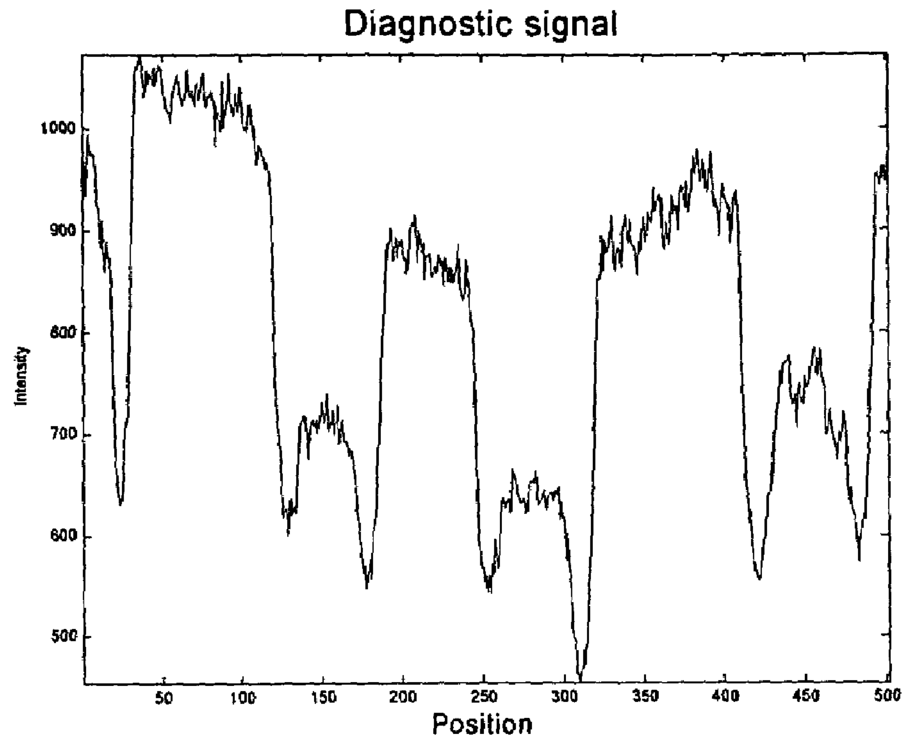
FIG. 13 shows a sample diagnostic signal.
Figure 14:
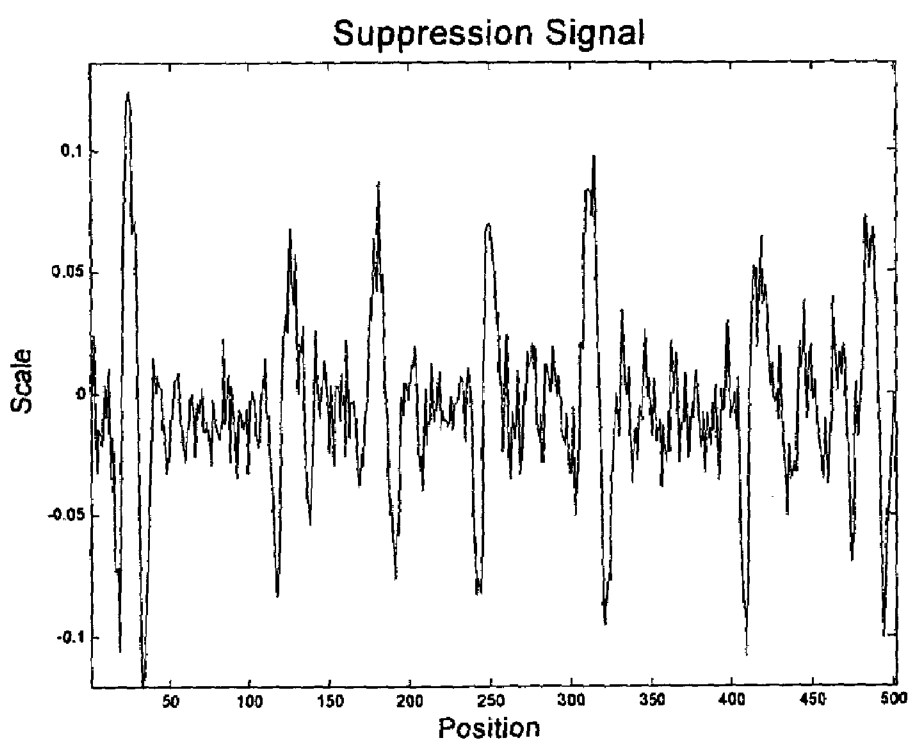
FIG. 14 shows the suppression signal of the method of FIG. 13, FIG. 15 applied to the input signal of FIG. 14 after applying a median filter with the same period as the periodic variation.

If the method of the present invention would be applied to a real diagnostic signal (FIG. 13) more than the periodic variation would be filtered out (FIG. 14).

This effect cannot be resolved by careful tuning of the parameters or choosing a different filter.

To solve this problem, a post-processing filter is applied to the response of the high-pass frequency filter $P=S\times\Im^{-1}(W)$ of equation (3).

The post processing filter is designed in such a way that the filter has the same period as the period of the variation to be removed.

If the signal has period T, this maps to separating the signal into T signals where the pixels have a corresponding phase.

$$\forall i\in[0,T[:P^i=(p_i,p_{i+T},p_{i+2T},p_{i+T},\ldots)$$

where $p_i$ is the $i^{th}$ element of the extracted periodic variation P.

For each signal $P^i$, a high frequency attenuating filter is applied. To filter the vertical stripes originated in a microlens digitizer system, a median filter is chosen of a certain size k. The choice of k is not critical. It needs to be large enough to filter all reoccurring erroneous filter responses and small enough to adapt itself to varying thickness of the emitting imaging plate. A kernel that is too large however, can have significant impact on execution times and may be too robust for changes in thickness of the imaging plate. A suitable size for processing diagnostic images is found to be 7.

Known image processing techniques can be used to compute the median elements at the border of the signal. Extension of the signal at its both ends with a mirrored version of the signal with the size of the filter kernel eliminates the filter edge effect mostly. Dependent on the variance of the input signal, one can think of varying schemes to automatically determine the size of the median kernel or low pass filter to make the filter more robust for varying input signals.

After post-processing of the filter responses $P^i$, the filtered version of the suppression signal P is reconstructed:

$$P_c = (p_0^{0\prime}, p_0^{1\prime}, \ldots, p_0^{T-1\prime}, p_1^{0\prime}, p_1^{1\prime}, \ldots, p_1^{T-1\prime}, p_2^{0\prime}, p_2^{1\prime}, \ldots, p_2^{T-1\prime}, \ldots)$$

where ${p^{i\prime}}_j$ is the $j^{th}$ element of $P^{i\prime}$, the post-processed filter response $P^i$.

and the corrected signal is computed:

$$S'_c = S - P_c$$

Figure 15:
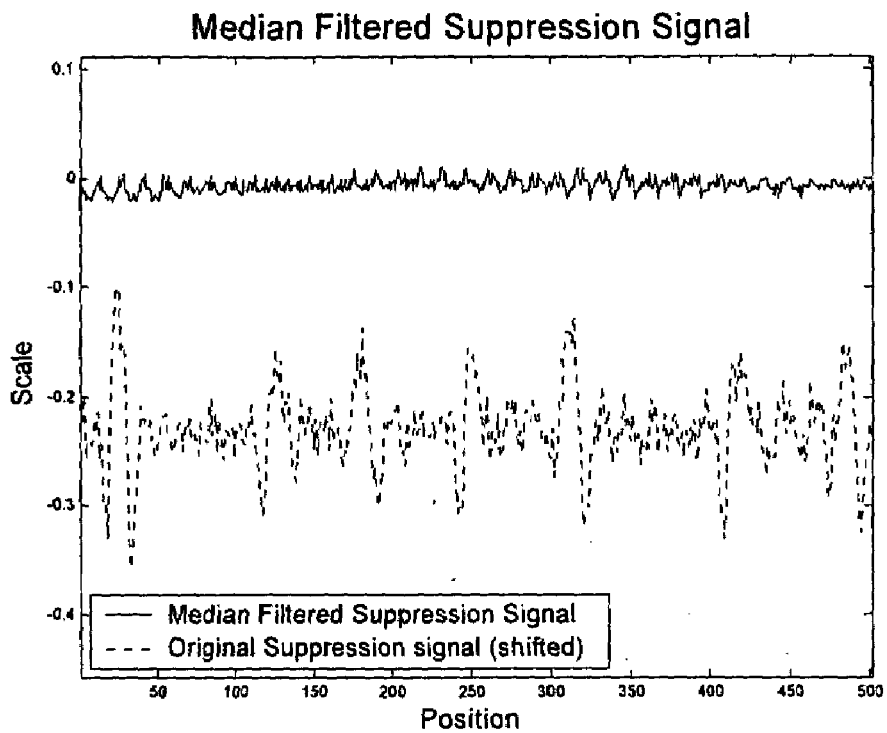
Figure 16:
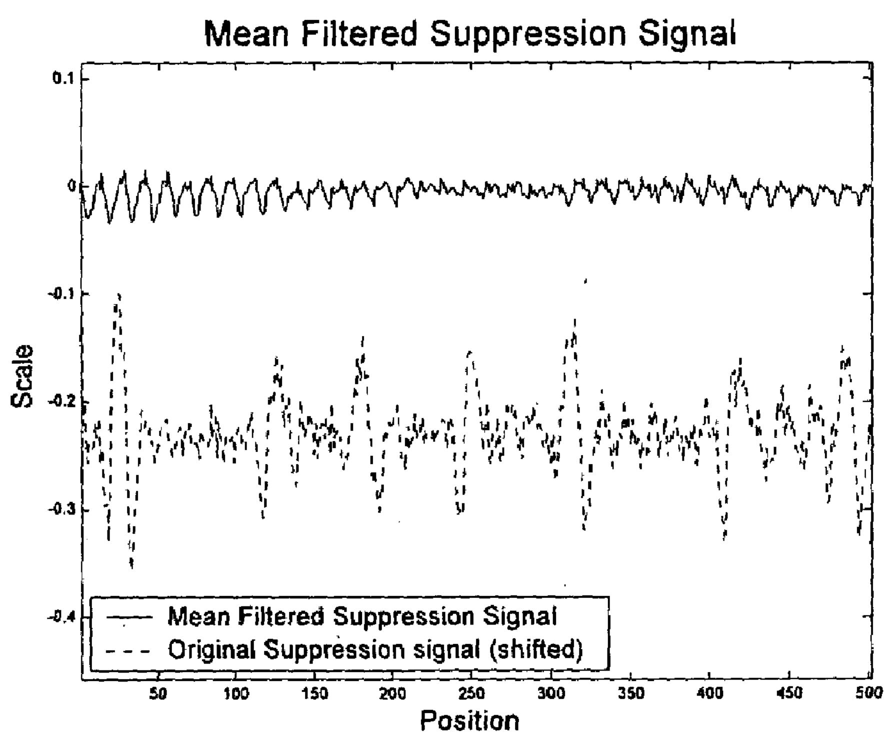
FIG. 16 shows the suppression signal of FIG. 14 suppression signal after applying a median filter with the same period as the periodic variation.

An example of the suppression signals P and median filtered suppression signal $P_c$ for the diagnostic input signal, given in FIG. 13, is shown in FIG. 15. FIG. 16 shows a mean filtered version of the filter responses $P^i$.

Figure 17:
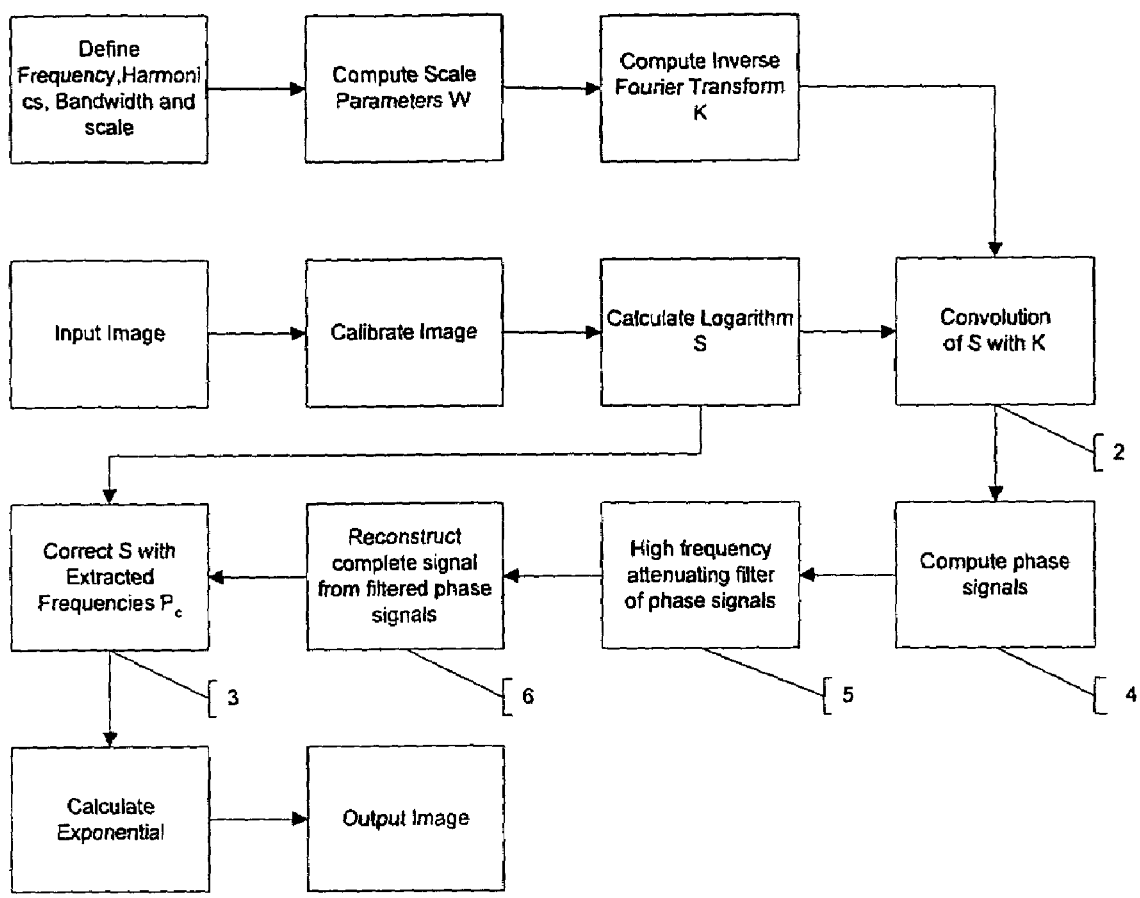
FIG. 17 shows the block diagram of the method according to the present invention for processing one-dimensional signals.

If the post processing low pass filter is placed between blocks 2 and 3 of the algorithm in FIG. 9, the correction algorithm is changed to the version depicted in FIG. 17. To reduce memory consumption and overhead of copying the data, a virtual repartitioning and reconstruction of the signal can be implemented while filtering the data. This reduces blocks 4,5 and 6 to one block.

The algorithm of FIG. 17 is easily extended to two dimensions by extension of the suppression scale parameters in the Fourier domain to two dimensions. This transforms the one-dimensional convolution to a two-dimensional convolution. If the suppression parameters in the Fourier domain are chosen carefully, one can separate the convolution. The original convolution is replaced by a convolution orthogonal to the periodic variation and a convolution parallel with the periodic variation.

In case of a digitizing system using microlenses, this maps respectively to a horizontal and vertical convolution.

The post-processing step can also be extended to two dimensions to make the filter even more robust.

Figure 18:
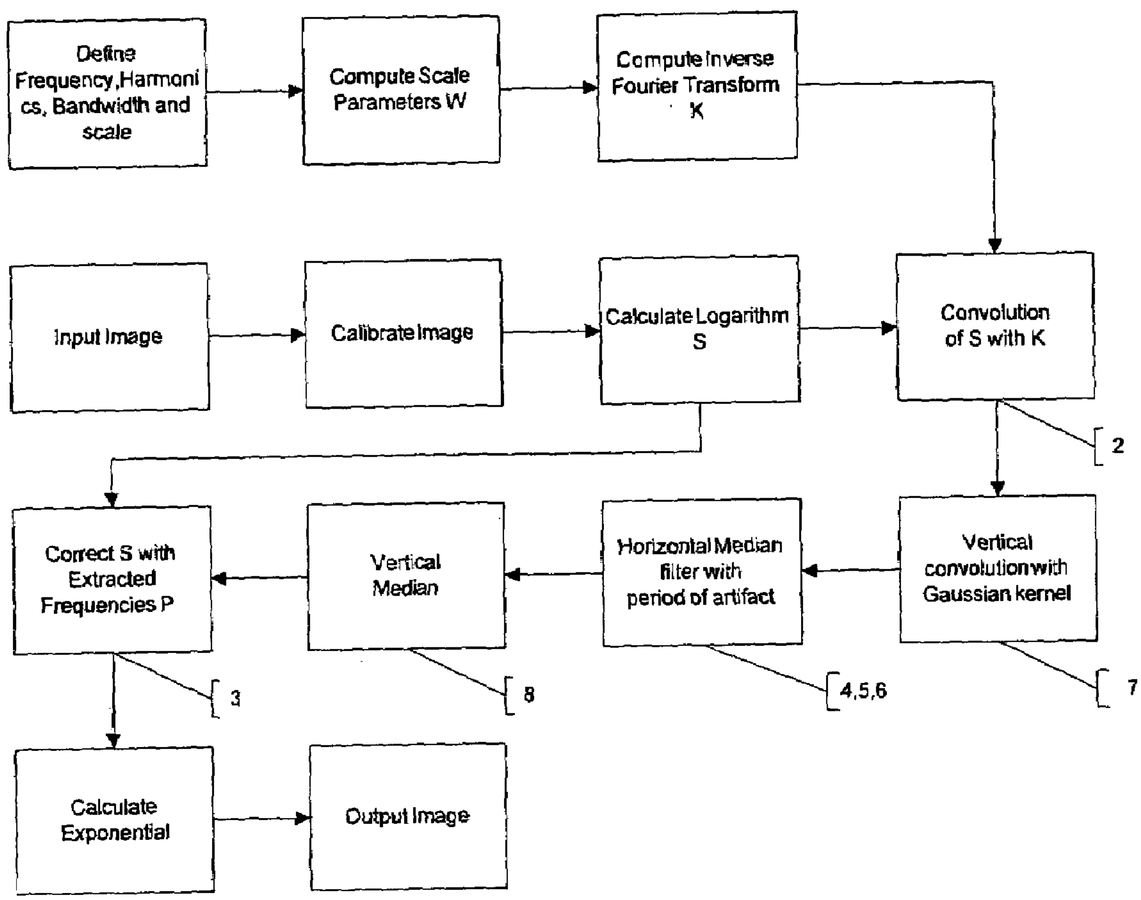
FIG. 18 shows the block diagram of an implementation of the invented algorithm for processing two-dimensional signals.

If we define $$W_s = \sum_{i=-5}^{5} \sum_{j=-\infty}^{\infty} \sum_{k=-\infty}^{\infty} e^{-\frac{(j-iF)^2}{2\sigma_i^2}} e^{-\frac{k^2}{2\sigma - k^2}},$$

the convolution step in FIG. 17 is separated into a horizontal convolution with the kernel of FIG. 9 and a Gaussian smoothing kernel in the parallel direction. For diagnostic image processing, we choose to apply a median filter in the direction parallel with the periodic variation. The algorithm of FIG. 17 transforms to FIG. 18.

Having described in detail preferred embodiments of the current invention, it will now be apparent to those skilled in the art that numerous modifications can be made therein without departing from the scope of the invention as defined in the appending claims.

We claim:

1. Method of suppressing periodic variations in a digital signal comprising the steps of filtering said digital signal to obtain a suppression signal representing the periodic variation of said digital signal, separating said suppression signal into T separation signals, each of these T separation signals containing values of said suppression signal having equal phase in said suppression signal, applying high frequency attenuating filtering to each of said separation signals to obtain filtered separation signals, reconstructing a corrected suppression signal from said filtered separation signals, correcting said digital signal by means of said corrected suppression signal.

2. Method according to claim 1 wherein said digital signal is a two-dimensional signal representation of an image.

3. Method according to claim 1 wherein said periodic variations originate from light-guiding by an array of microlenses.

4. Method according to claim 1 wherein said suppression signal representing said periodic variation is obtained by high pass filtering said digital signal.

* * * * *